(12) United States Patent
Glasgow et al.

(10) Patent No.: US 10,258,981 B2
(45) Date of Patent: Apr. 16, 2019

(54) DISPENSED LIQUID MEASUREMENT DEVICE

(71) Applicant: Forward Biotech, Inc., Averill Park, NY (US)

(72) Inventors: Ian K. Glasgow, Averill Park, NY (US); Brian Kolb, Menands, NY (US); Andrea Habura, Brunswick, NY (US)

(73) Assignee: Forward Biotech, Inc., Troy, NY (US)

( * ) Notice: Subject to any disclaimer, the term of this patent is extended or adjusted under 35 U.S.C. 154(b) by 52 days.

(21) Appl. No.: 15/375,767

(22) Filed: Dec. 12, 2016

(65) Prior Publication Data

US 2017/0087546 A1  Mar. 30, 2017

Related U.S. Application Data

(63) Continuation of application No. 14/096,940, filed on Dec. 4, 2013, now Pat. No. 9,517,464.

(Continued)

(51) Int. Cl.
*G01F 25/00* (2006.01)
*B01L 3/02* (2006.01)
(Continued)

(52) U.S. Cl.
CPC ........... *B01L 3/0293* (2013.01); *B01L 3/5027* (2013.01); *G01F 17/00* (2013.01);
(Continued)

(58) Field of Classification Search
CPC .................. G01F 25/0084; G01F 25/0092
See application file for complete search history.

(56) References Cited

U.S. PATENT DOCUMENTS 3,952,599 A   4/1976  Ayres
4,902,629 A * 2/1990  Meserol ............ B01L 3/502738
                                                      422/504

(Continued)

FOREIGN PATENT DOCUMENTS

WO   2015099532 A1   7/2015

OTHER PUBLICATIONS

Kim, Y., International Application No. PCT/US2017/025061, International Search Report and Written Opinion, dated Jun. 19, 2017, 14 pages.

(Continued)

*Primary Examiner* — Charlie Y Peng
(74) *Attorney, Agent, or Firm* — LaBatt, LLC (57) ABSTRACT

A measurement device containing one or more capillaries to measure the volume of a dispensed fluid and determine the volumetric accuracy of the dispensing device. The measurement device can contain a reservoir containing the fluid to be measured and there may be an additional reservoir for a secondary fluid. A viewing window is necessary to complete a manual measurement and may include a magnifying lens. The liquid well by the capillary inlet may be shaped such that the measurement fluid is directed toward the capillary. The well may have features designed to position the dispensing device toward the capillary, or to position the well proximal to the capillary after it is filled. The well may also have surfaces or coatings which attract or do not attract various types of substances. The measurement device may interface with sensors to output measurement data.

20 Claims, 11 Drawing Sheets

Related U.S. Application Data (60) Provisional application No. 61/733,706, filed on Dec. 5, 2012.

(51) Int. Cl.
  *B01L 3/00* (2006.01)
  *G01F 17/00* (2006.01)

(52) U.S. Cl.
  CPC ...... *G01F 25/0084* (2013.01); *G01F 25/0092* (2013.01); *B01L 2200/148* (2013.01); *B01L 2300/028* (2013.01); *B01L 2300/0838* (2013.01); *B01L 2400/0406* (2013.01)

(56) References Cited

U.S. PATENT DOCUMENTS

| | | |
|---|---|---|
| 5,059,398 A | 10/1991 | Kenney |
| 5,173,266 A | 12/1992 | Kenney |
| 5,460,782 A | 10/1995 | Coleman et al. |
| 5,599,502 A | 2/1997 | Miyazaki et al. |
| 6,401,769 B1 | 6/2002 | Backes et al. |
| 6,531,098 B1 | 3/2003 | Kenney |
| 7,861,581 B2 | 1/2011 | Schardt et al. |
| 8,080,218 B2 | 12/2011 | Karg et al. |
| 2003/0107738 A1 | 6/2003 | Curtis |
| 2006/0233671 A1 | 10/2006 | Beard et al. |
| 2007/0086927 A1 | 4/2007 | Natarajan et al. |
| 2008/0066523 A1 | 3/2008 | Schmid et al. |
| 2008/0145835 A1 | 6/2008 | Alajem et al. |
| 2009/0193913 A1 | 8/2009 | Saiki |
| 2010/0267065 A1 | 10/2010 | Geiger et al. |
| 2010/0303686 A1 | 12/2010 | Horiuchi et al. |
| 2011/0056287 A1 | 3/2011 | Schardt et al. |
| 2013/0164193 A1 | 6/2013 | Semenov et al. |
| 2014/0150522 A1 | 6/2014 | Glasgow et al. |

OTHER PUBLICATIONS

Peng, U.S. Appl. No. 14/096,940, Notice of Allowance, dated Nov. 10, 2015, 16 pages.

Peng, U.S. Appl. No. 14/096,940, Non-Final Rejection1, dated Jun. 17, 2015, 16 pages.

\* cited by examiner

DISPENSED LIQUID MEASUREMENT DEVICE

REFERENCE TO RELATED APPLICATIONS

The current application is a continuation of U.S. patent application Ser. No. 14/096,940, which was filed on 4 Dec. 2013, and which is hereby incorporated by reference. U.S. patent application Ser. No. 14/096,940 claims the benefit of U.S. Provisional Application No. 61/733,706, which was filed on 5 Dec. 2012.

FIELD OF THE INVENTION

The present invention is in the technical field of fluid measurement and testing.

More particularly, the present invention is in the technical field of calibrating or verifying the calibration of fluid dispensing devices. Some examples of these devices are, but are not limited to: pipettors, multi-channel pipettors, or automated dispensers. The present invention may be used to measure the accuracy of the device for aspirating and dispensing a specific volume of liquid. In particular, the field of the invention relates to the confirmation that the device is correctly calibrated such that the volume of liquid aspirated and dispensed is accurate and repeatable within the error limits determined by the manufacturer of the device and international standards such as ISO 17025.

BACKGROUND OF THE INVENTION

Liquid handling pipettors are an essential tool and are used extensively in laboratories across but not limited to such industries as academic research, applied testing, and medical diagnostics.

The purpose of the pipettor is to transfer specific volumes of liquid between containers. Examples of this action include but are not limited to: the sub-sampling of patient liquid samples such as blood or urine from a patient sampling vessel to an analysis vessel such as the 96-well microtiter plate; the assembly of individual reagents from master stocks to a tube containing a mixture or reagents such as would be used for polymerase chain reaction (PCR); and transfer of tissue culture growth media from stock to individual cultures.

Pipettors by design are accurate at measuring specific volumes of liquids. The volumes of liquids measured can range from nanoliters to milliliters. Because of the extensive range of volumes measured, pipettors are manufactured to cover a subset of volumes such as but not limited to: less than 1 microliter, 1-2 microliters, 1 to 10 microliters, 10 to 100 microliters, 20 to 200 microliters, 100 to 1000 microliters, 1 milliliter to 5 milliters.

In order for pipettors to accurately measure specific volumes, they must be routinely tested and calibrated. This routine testing and calibration is extremely important and often specified in a laboratory's Standard Operating Procedure (SOP). Evidence of routine verification and calibration of pipettors may even be subjected to audit by third party organizations such as those that regulate medical diagnostics and applied testing laboratories.

Verification and calibration of pipettors is most usually done gravimetrically, by weighing the dispensed amount of a reference liquid such as water. This method requires the use of an extremely accurate set of weighing scales, such as a 6 decimal point scale used to measure weights as small as 1 microgram. These scales are themselves verified and calibrated against an external weight reference or calibration device that has been certified as true and accurate measure of weight.

Another commonly used method is an absorbance-based system that utilizes a photometer and dual color dye as the basis of pipettor calibration verification. One such system uses a known concentration of a dye that absorbs at one wavelength. The photometer determines the vial pathlength, and then a dye solution of known concentration and a different absorbance maximum is pipetted (using the pipettor to be calibrated) into the reference solution. The solutions are mixed by the photometer and the absorbance is read. The photometer and software convert the absorbance reading to the volume pipetted, and the result is printed. After the user has taken the desired number of data points with the pipettor, the device generates a printed result with statistical data that comprises individual sample volumes or replicates, mean volume of all replicates, % CV (precision), and inaccuracy from target volume. The machines necessary for this method are fairly expensive.

The calibration process is arduous, time consuming, and prone to inaccuracies, particularly at small volumes where evaporation of water and the propensity for water to adhere to plastics can introduce error. At these lower volumes, the movement of air currents across the pan of a sensitive scale, or slight vibrations transmitted through a building's structure, can also introduce error in gravimetric analyses.

A typical gravimetric process involves repetitive weighing of a series of water volumes appropriate to the dispensation range of the pipettor, e.g. 2 microliters, 10 microliters and 20 microliters for a pipettor with a stated range of 2-20 microliters. These measurements are often in the range where environmental inaccuracies described above are significant (generally <100 microliters). The process would be repeated at least 6 times to obtain a reliable accuracy for each volume: for example, 100 microliters±2.0 microliters. At this volume the pipettor would be said to have an accuracy of 100 microliters with a critical variance (CV) of ≤2%.

The pipettor is fitted with a disposable plastic tip that contacts the liquid being transferred. The underlying mechanism of the pipettor is a piston housed in a cylinder. As the piston moves downwards in the cylinder air is displaced. The piston is depressed to a specified distance by the action of the thumb pushing downwards on the top of the piston or by a small electric motor and a drive assembly such as a worm gear. The pipette tip is inserted into the liquid to be transferred and then the piston allowed to return to its original position; the displaced air is replaced by liquid, filling the pipette tip with the required volume of liquid. The pipette and tip are moved to the target vessel and the piston again depressed and the liquid ejected. Over-pipetting, i.e. depressing the piston slightly further than before the liquid was aspirated, ensures that all liquid within the pipette tip is ejected. The piston is returned to its pre-pipetting position and the disposable pipette tip ejected.

The starting position of the piston and the distance the piston travels is set by the user before the liquid is aspirated. The start position of the piston is set via a volume control wheel for manual setting or digitally for a motor-driven electronic pipettor. The user simply adjusts the volume control wheel or the digital display to display the intended volume to be transferred. The user proceeds to transfer the nominated liquid volume as described above.

Current verification and volume calibration involves confirming, by gravimetric or dye absorbance methods, that the selected volume shown on the pipettor and the volume of liquid aspirated and dispensed are identical with respect to target volume and CV of variance. If there is disagreement between the selected volume to be dispensed and the actual volume dispensed, then the pipettor is out of calibration. Before the pipettor can be used for routine laboratory use it must be calibrated to insure the accuracy of the volume dispensed with respect to the selected volume shown on the pipettor.

While others have developed methods for collecting selected volumes of liquids using the geometry of the capillary-type device, such as Kenney in U.S. Pat. No. 6,531,098 and Karg et al. in U.S. Pat. No. 8,080,218, no one has invented an easy method of determining whether a desired volume of liquid is accurately dispensed.

The invention described eliminates the arduousness of determining if a pipettor is within acceptable accuracy limits. It entails a simple method of validating the calibration of the pipettor, and, within the accuracy limits of the device, performing the calibration. In addition, while current methods of calibrating pipettors indirectly determine the volume dispensed, either by determining weight or the absorbance of a dye contained in the dispensed liquid, this invention directly measures the volume dispensed by the pipettor. Thirdly, this invention allows for high throughput automation, with the device taking the form of a standardized microwell or microtiter plate.

SUMMARY OF THE INVENTION

The present invention provides a measuring device, which includes a capillary and a well for dispensed liquid, positioned such that the inlet end of the capillary can contact liquid placed in the well. The entire measuring device, or just the capillary, could be disposable or reusable. Markings on the capillary or on the measuring device can correspond with the volume inside the capillary. The liquid dispensed into the well, and subsequently drawn into the capillary, can be accurately determined, by comparing the location of the liquid/air interface meniscus with the markings. Alternatively, sensors could determine the location of the meniscus or multiple meniscuses.

DETAILED DESCRIPTION OF THE PREFERRED EMBODIMENTS

Figure 1:
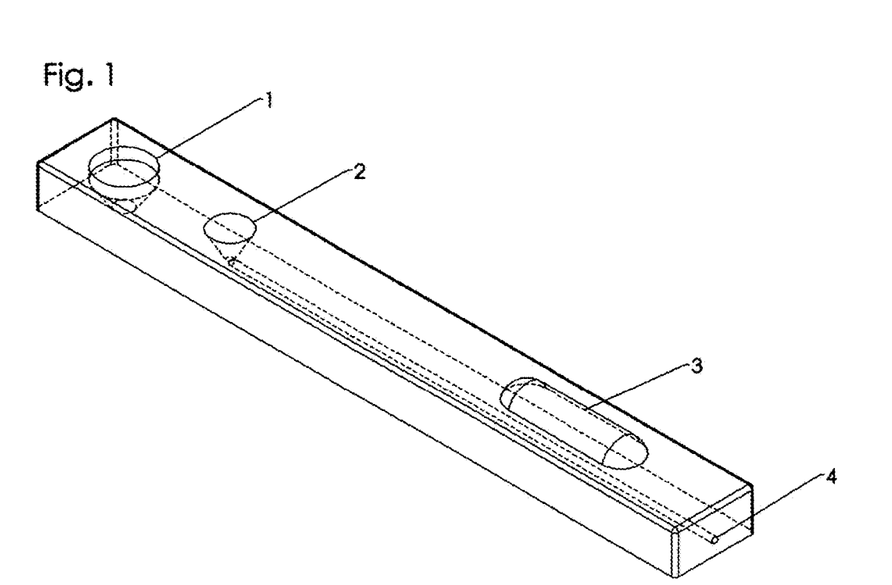
FIG. 1 is a perspective view of a measurement device of the present invention for use with one fluid.
Figure 2:
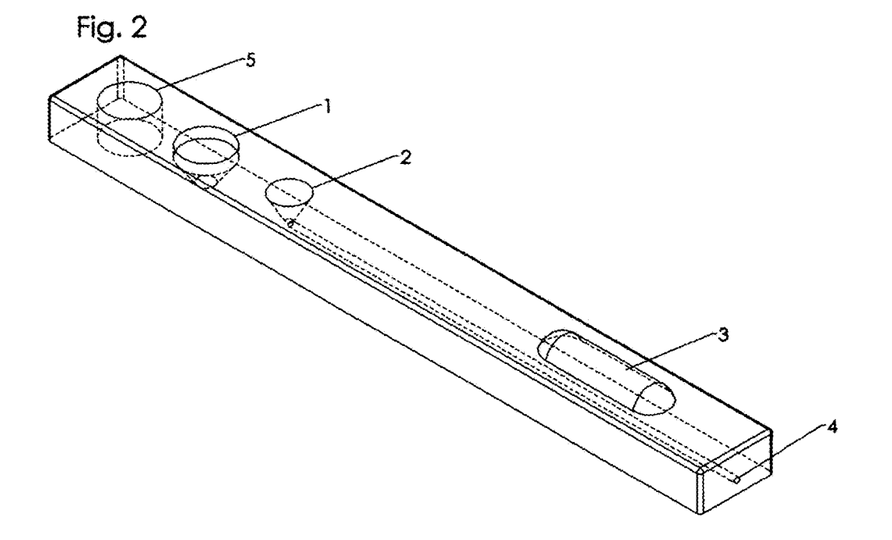
FIG. 2 is a perspective view of a measurement device of the present invention for use with two fluids.

Referring now to the invention in more detail, in FIG. 1 there is shown a measurement device containing a capillary (4) extending from the funnel shaped well (2) toward and beyond a viewing window, which may be a magnifying lens (3). The proximal end of the capillary is the inlet end by the funnel shaped well. The fluid to be dispensed can be collected from the reservoir (1) by a dispensing device such as a pipette or micropipettor. This fluid can contain a dye for better viewing, and the reservoir may be filled with a sufficient amount of fluid or dye and sealed during manufacture of the measurement device. FIG. 2 shows an optional additional reservoir (5) for a secondary liquid. This secondary liquid can be used to fill the funnel shaped well (2) so long as the secondary liquid is not attracted to the capillary. The secondary liquid can then be used to prevent attraction between the fluid being measured and the measuring device material.

Figure 3:
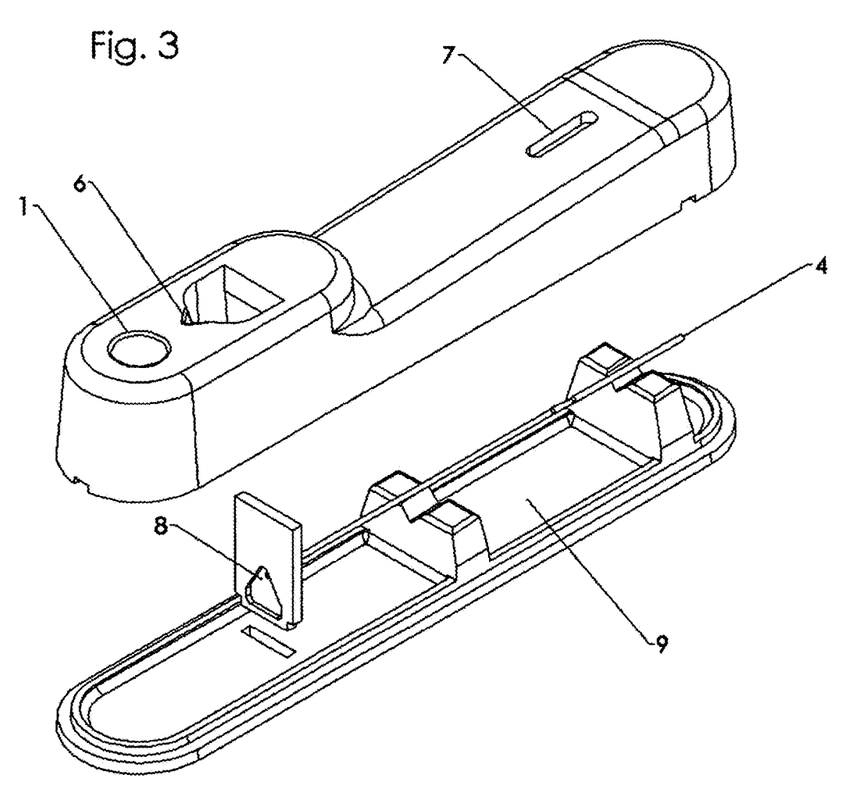
FIG. 3 is a perspective view of a measurement device of the present invention with dispenser tip positioning.

In FIG. 3 there is shown a measurement device with a v-shaped contour (6) and inverted v-shaped aperture (8) for positioning of the dispensing device toward the capillary (4). The v-shaped contour (6) is located on the top edge of the well and enables the dispensing device or pipette tip to rest upon it. The tip is then pushed at an angle toward the capillary until it encounters the inverted v-shaped aperture (8). As the center of gravity of the dispensing device is located at some point outside of the positioning features, gravity assists in holding the dispensing device in the two positioning v-shapes. This facilitates the necessary positioning of the dispensing device for correct functioning of the measurement device. The top surface of the housing includes a non-magnifying viewing window (7) at the region near the desired measurement. The bottom surface of the housing (9) includes v-shaped standoffs for supporting the capillary (4).

Measuring devices for different volumes could have wells of different sizes and shapes. Measuring devices for use with different pipette tips could have wells with different contours (6).

Liquid by the inlet of the capillary will be drawn into the capillary by surface tension. If the liquid in the well is in one continuous aliquot, the entire aliquot of liquid will be drawn into the capillary. For example, if the capillary is hydrophilic and if the well in the measuring device is hydrophobic, an aqueous solution in the well will be drawn into the capillary.

Glass and fused silica, common materials for capillaries, are typically hydrophilic. In addition, many capillaries are available with hydrophilic coatings, by companies such as the Drummond Scientific Company. Most petroleum based plastics, including polypropylene, polystyrene, and many materials commonly used in injection molding, are hydrophobic.

The capillary in FIG. 3 is shown to be at a slight incline of 3 degrees. This ensures that the aliquot will remain at the proximal or inlet end of the capillary. Surface tension prevents the aliquot of measuring liquid from flowing out of the inlet. Thus by knowing the position of the inlet end of the capillary and the location of the meniscus, the length of the aliquot of liquid is thus known, too. By knowing the inside diameter of the capillary, or the cross-sectional area as a function of position along the capillary, the volume of liquid in the capillary can be calculated.

Figure 4:
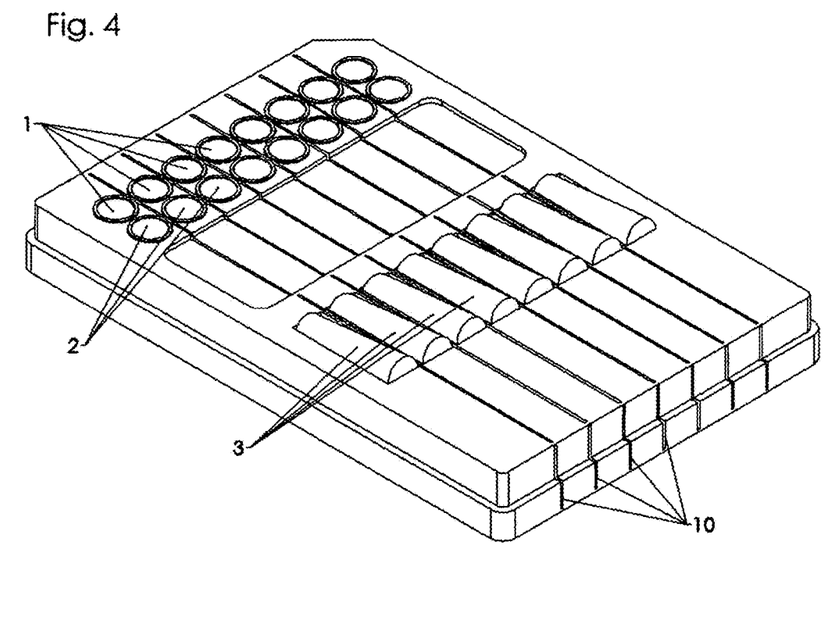
FIG. 4 is a perspective view of a measurement device of the present invention with multiple capillaries.

In FIG. 4 there is shown a measurement device with a plurality of capillaries, wells (2), reservoirs (1) and magnifying lenses (3) or windows to permit measurement of multi-channel dispensing devices such as multi-channel hand held pipettors or pipetting robots. Additionally, FIG. 4 shows a multi-channel measurement device that can be broken apart due to spaced cuts (10) in the housing. With multi-channel pipettors available for different numbers of channels, the measuring device can then be matched to the pipettor or even to just one channel by snapping the remaining material not already cut or removed during manufacturing. The multi-channel measurement device can be of a SBS compatible spacing and geometry so that it can be used with commonly available dispensing devices. Conversely, multiple single or multiple channel measuring devices could be linked together, through interlocking tabs, spring tabs, or equivalent means.

Figure 5:
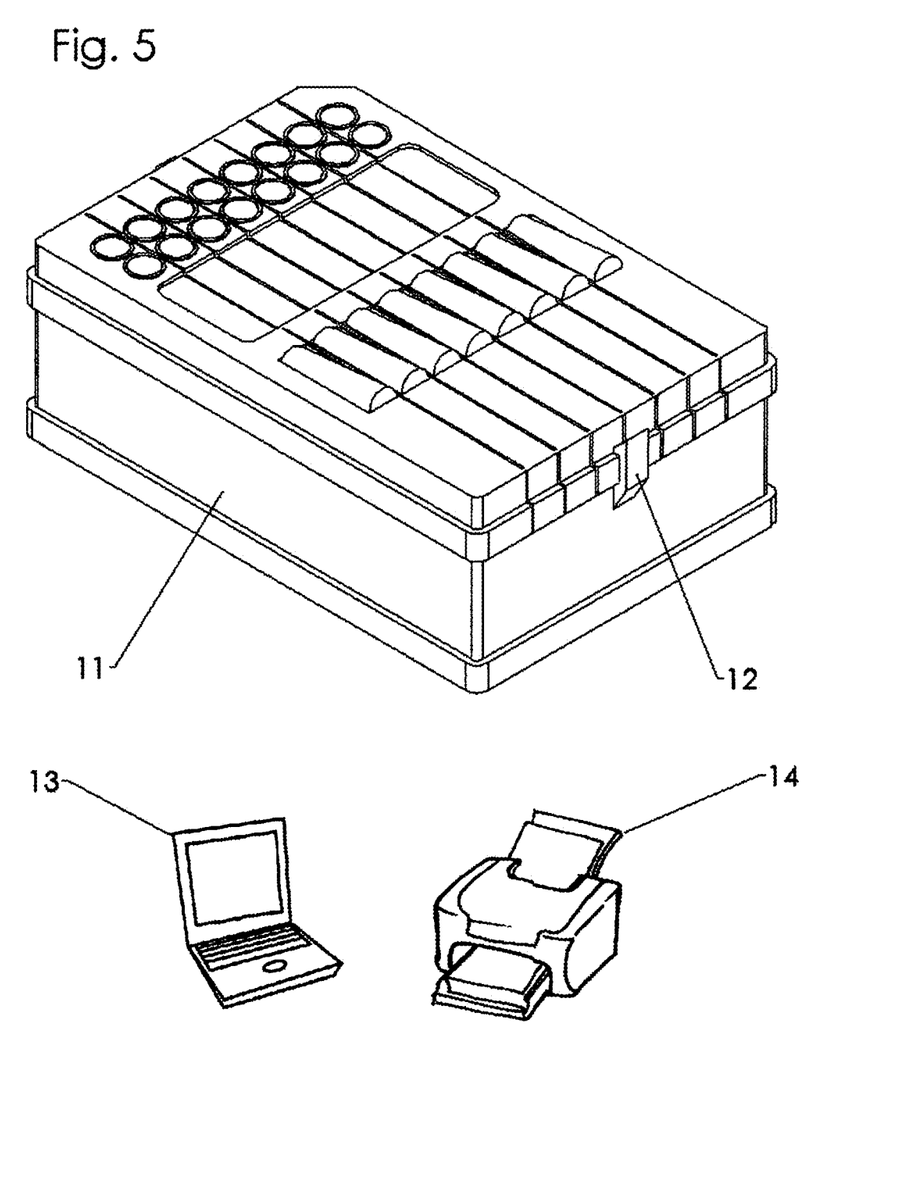
FIG. 5 is a perspective view of a measurement device of the present invention with use in conjunction with an automatic reporting device.
Figure 10:
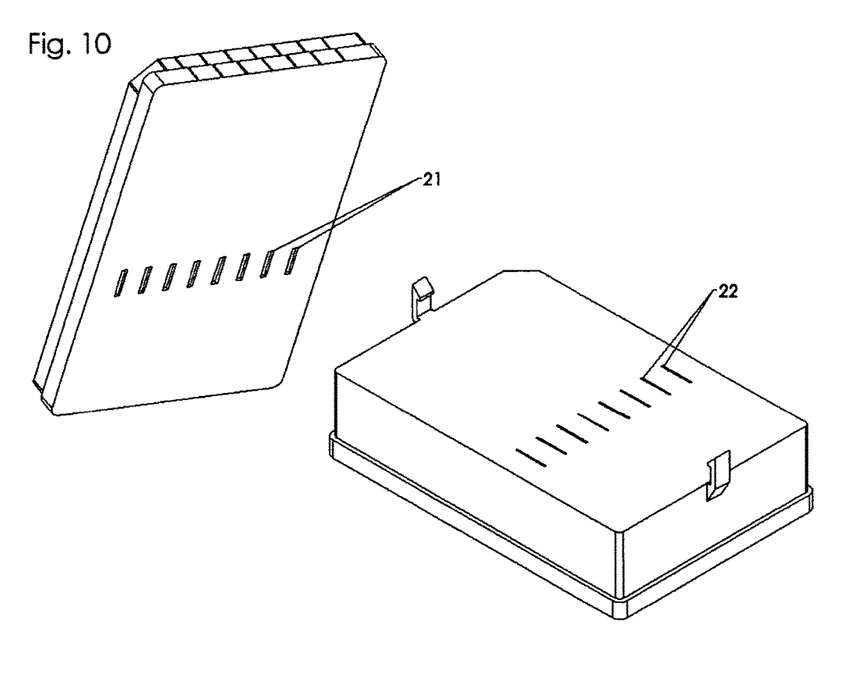
FIG. 10 shows the device and a complementary instrument for reading the device.

In FIG. 5 there is shown an instrument (11) which interfaces with the measuring device in order to produce a digital measurement from the location of the fluid in a capillary or capillaries. This instrument (11) can then document the measurement by either sending the data to a computer (13) or directly to a printer (14) or recording the information onto a storage device, such as a memory stick. FIG. 10 shows a different perspective of the instrument (11) with sensors (22) that are positioned to align with windows (21) in the measuring device, whereby each window allows the sensor to monitor the liquid or liquid/air interface in the capillaries inside the measuring device. Note that the base with the sensors could have the geometry, including the shape of the bottom and sides, and also the location of the wells and reservoirs of a standard microtiter plate, as could the measuring device. This ensures that the base and the measuring device could easily interface with robotic systems. Note that the sensor may be able to determine the volume of liquid in the capillary without markings on the capillary, simply by knowing the precise location of the inlet end of the capillary, the internal diameter of the capillary, and the location of the meniscus. This can be accomplished if the capillary is accurately positioned with respect to the measuring device and the measuring device is accurately positioned with respect to the base with the sensors, or if the base with the sensors can determine the location of the inlet end of the capillary, such as with an optical window or mechanical stop, or if the liquid in the capillary is not confined to one end and the base can sense the location of the meniscus at both ends of the liquid plug in the capillary. If the measuring device has an identification code, the sensing device could correlate the measurement data with the measuring device.

Figure 6:
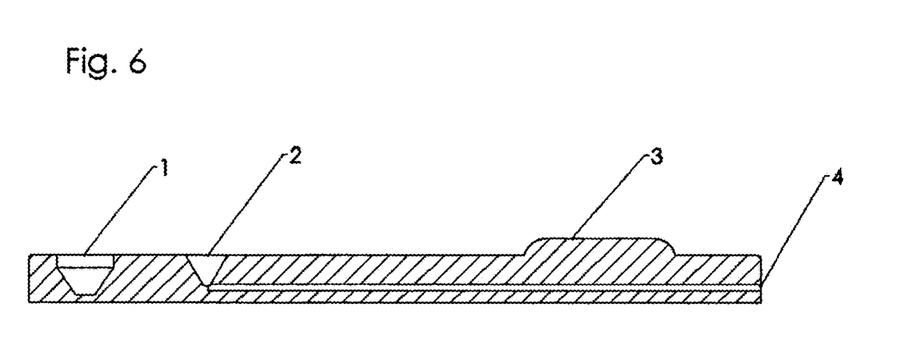
FIG. 6 is a section view of a measurement device of the present invention showing the fluid pathway.

In FIG. 6 there is shown a cross section view of the measurement device that clearly shows the path of the measurement fluid in the capillary (4) from a funnel shaped well (2) toward the viewing lens (3). The capillary (4) does not need to be located at the bottom of the funnel shaped well (2), but may be located at some height above the bottom. The capillary (4) can be located at a distance from the bottom of the funnel shaped well (2) of approximately one half of the diameter of a spherical amount of liquid of the measurement volume. Additionally, there are one or more reservoirs (1) for holding measurement fluid and possibly a secondary fluid to prevent the measurement fluid from being attracted to the walls of the well (2). Alternatively, the proximal end of the capillary (4) could be located further from the well (2), the distal end of the capillary (4) could extend beyond the cartridge. The user could slide the capillary (4) towards the well (2), thereby providing a means for moving the capillary (4) and well (2) towards each other.

Figure 7:
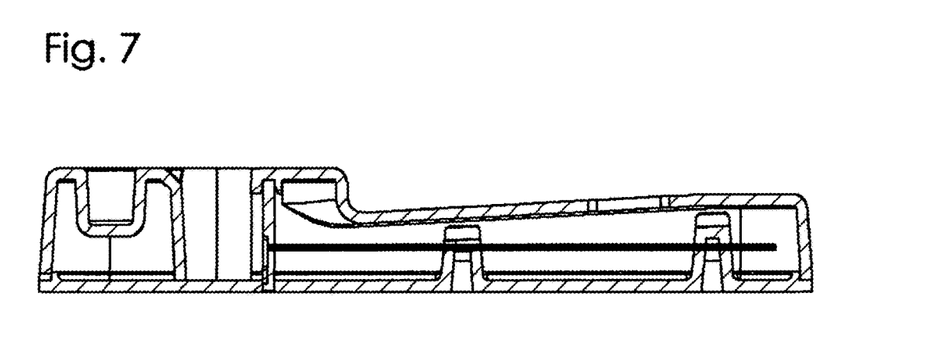
In FIG. 7 there is shown a cross section view of the measurement device with features for the positioning of dispensing devices.
Figure 8:
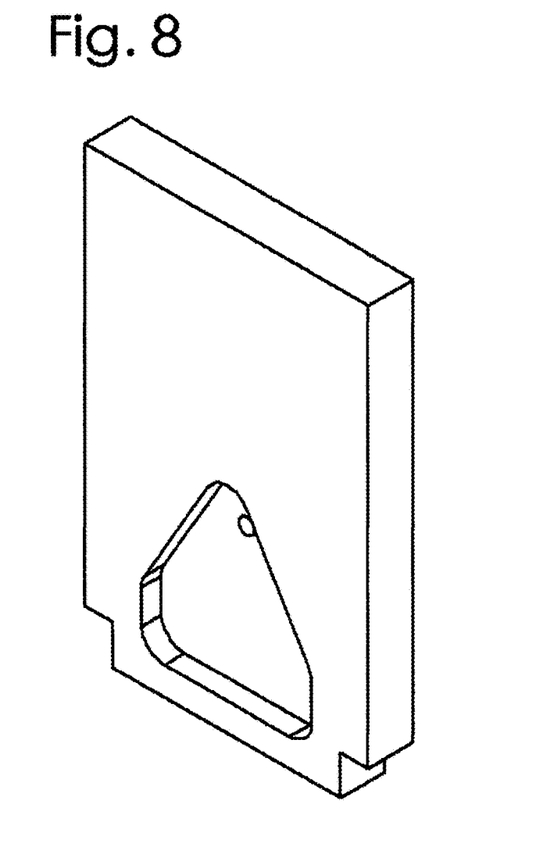
In FIG. 8 there is shown a piece of the measurement device for positioning the tip of the dispensing device at the opening of the capillary.

In FIG. 7 there is shown a cross section view of the measurement device with features for the positioning of a dispensing device. The top of the measuring device has a v-shaped contour for the dispensing device to sit in, with the assistance of gravity. An inverted v-shaped aperture as seen in more detail in FIG. 8 holds the dispensing device close to the end of the capillary to further assist transferring fluid from the dispensing device to the inlet opening of the capillary. The inlet end of the capillary (4) is flush with the bottom surface of the recess in the plate, to ensure that the liquid contacts the capillary, yet the external cylindrical surface of the capillary is not exposed and hindering the dispensed liquid from entering the capillary. These features may hold the dispensing device at an angle so that fluid can be transferred to the capillary while any dispensed or aspirated air can separate from the liquid and will not enter the capillary.

Figure 11:
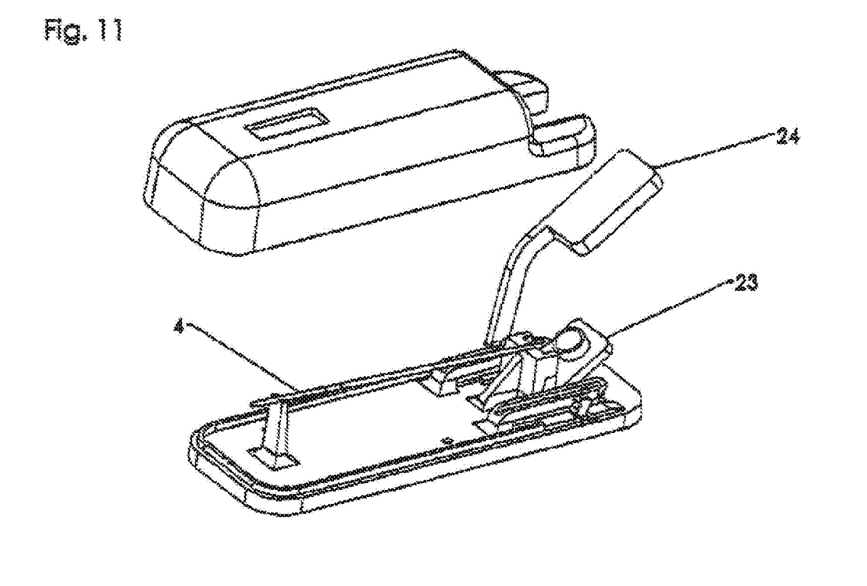
FIG. 11 is a view of a device in which the well moves into proximity with the inlet of the capillary.
Figure 12:
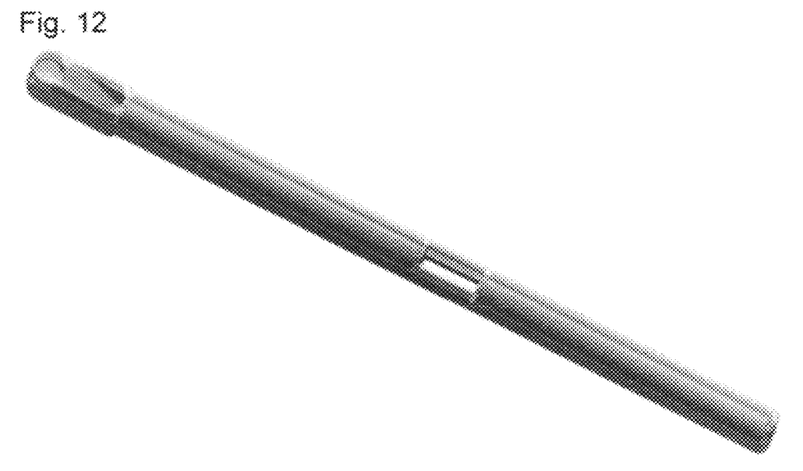
FIG. 12 is a view of a device in which there is an open space acting as a window to view the capillary.
Figure 13:
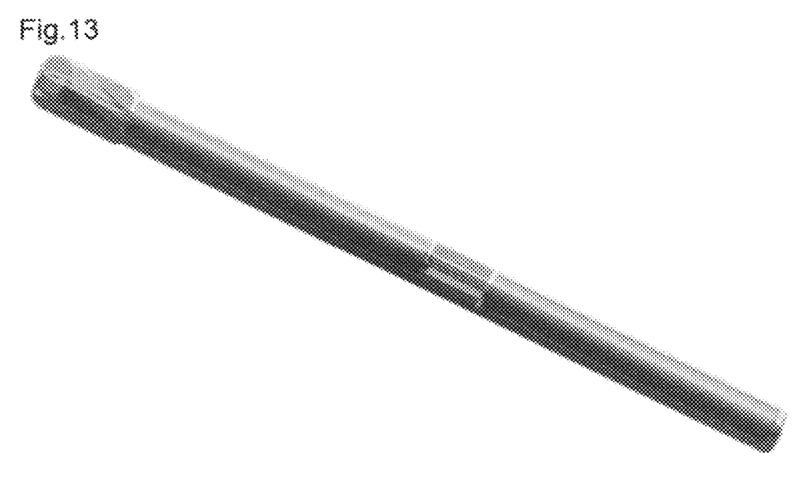
FIG. 13 is a view of a device in which there is a lens to enlarge the view of the capillary.
Figure 14:
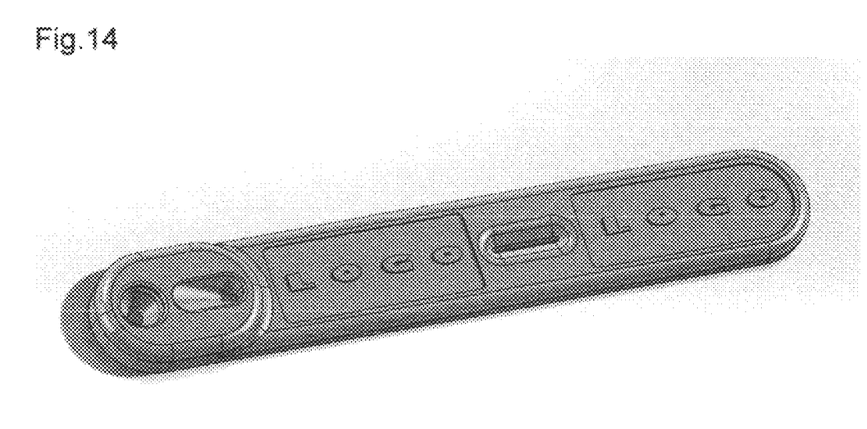
FIG. 14 is a view of a device with a recess for viewing the capillary.
Figure 15:
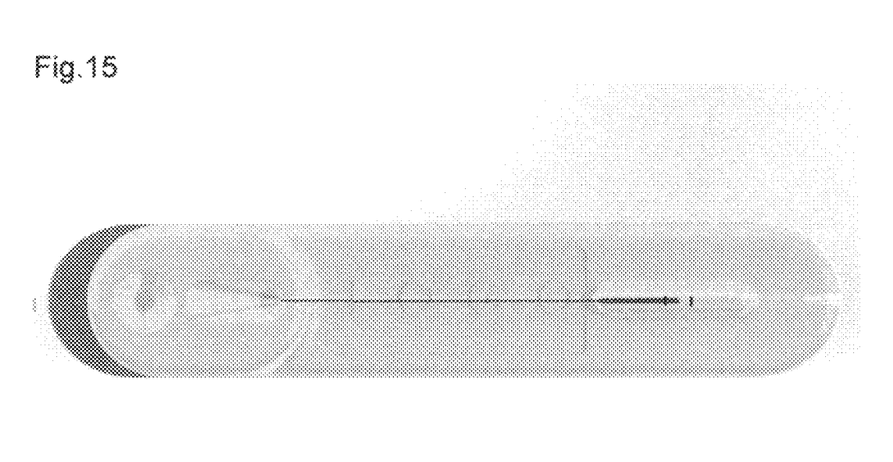
FIG. 15 is a view of a device with lines to provide a visual reading of accuracy and a quantity of dye that is shown to match the volume measured by the device.
Figure 16:
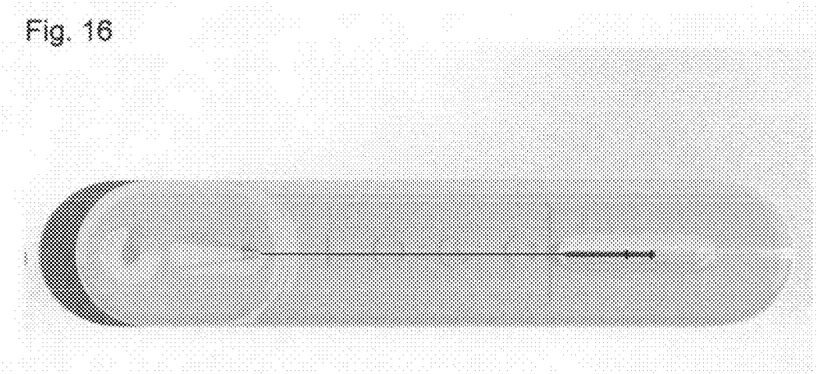
FIG. 16 is a view of a device with lines to provide a visual reading of accuracy and a quantity of dye that is shown to be greater than the volume measured by the device.
Figure 17:
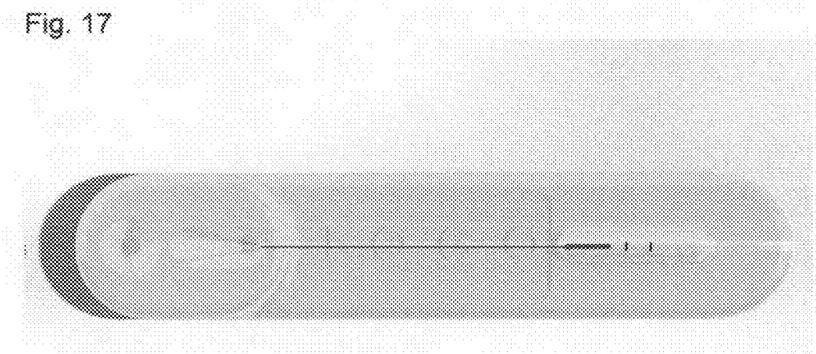
FIG. 17 is a view of a device with lines to provide a visual reading of accuracy and a quantity of dye that is shown to be less than the volume measured by the device.

In another embodiment, as shown in FIG. 11, the pipettor dispenses the measuring liquid into the well, and then the well is pivoted into proximity with the inlet of the capillary (4), also called the proximal end, thereby providing a means for moving the capillary (4) and well closer to each other. The well may be, but is not limited to, a conoid or hemisphere in shape. The well will be positioned such that in its resting position, it lies with its opening facing toward the top of the measuring device, or in another position that may facilitate access with a pipet tip. This has two advantages: the user can dispense liquid into a horizontal well; and any extra spurts of air will be released while the well is far from the inlet of the capillary and will thus not affect the results. Surface tension holds the liquid in the well, even as the well is pivoted into a vertical position.

As the measuring liquid in the well comes into contact with the capillary inlet, surface tension draws all of the liquid from the well into the capillary. When the pivot well plate (23) is rotated using the handle (24), the well is brought in proximity to the inlet of the capillary, it will be positioned so that the inlet is within the dispensed droplet but not entirely pressed against the wall of the well. The pivot may be designed such that it will come into contact with physical stops or other tactile feedback when the well is in the ideal position relative to the inlet of the capillary.

Figure 9:
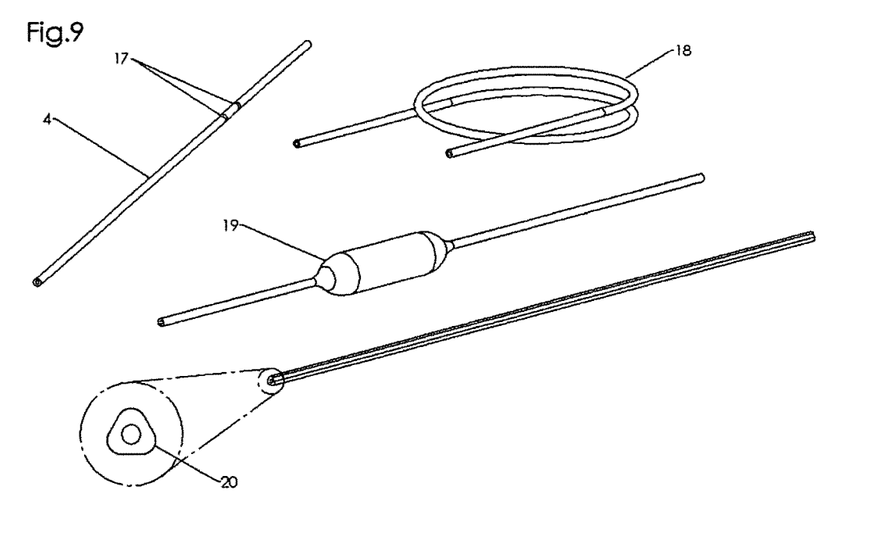
FIG. 9 shows several versions of the capillary, including straight, coiled, chambered, and shaped for visual magnification.

Various capillary versions are shown in FIG. 9, which illustrate that the capillary can be straight, or to save space or possibly for other reasons, can be shaped in a coil (18), or can have a chamber (19) with a long neck. The circumference of the capillary can also be shaped (20) to make it easier to visualize the meniscus. Markings on the capillary (17) can be opaque, translucent, molded, or engraved. The two markings shown would form a region indicating that if the meniscus falls in this region that the liquid volume is near the desired amount. The measuring device could have markings as well or in replacement for markings on the capillary. Multiple markings on the measuring device or on the capillary could be used to indicate a range of acceptable variation from a desired volume, or possibly be used for calibration.

The measuring device may contain one capillary, or it may contain a plurality of capillaries, either of the same or different sizes. Different sizes would allow for rapid testing of different volumes. A plurality of capillaries of the same size would allow for multiple tests of the same volume range or the testing of multi-channel pipettes or robotic liquid dispensers. The measuring device could be in the same format as microtiter plates, such as 96 or 384 well plates or could be in partially the same format, such that one or more rows of wells may be present, omitting some of the 24, 96, 384, 1536 or other amount of wells.

The capillaries could be replaceable. For example, if they were trapped in place with a spring tab, a user could replace the capillary. This would be for saving cost, since only the capillary would be replaced, and not the entire measuring device after each use.

The capillaries could be movable, so that they are not initially contiguous with the well. After the user dispenses the measuring liquid into the well, the user could move a handle thereby moving a mechanism, such as a 4 bar linkage system, that moves the capillary into position. Alternatively, the capillary could be laterally positioned by one or more holes and grooves. A spring tab could apply a slight pressure on the capillary to lightly hold it in place. Once the measuring liquid is dispensed into the well, The user could slide the capillary toward the well, so that its inlet is in contact with the measuring liquid.

The capillary in the measuring device could be transparent or translucent, made of glass or fused silica or clear plastic, manufactured by machining, casting, molding, or extruding, possibly with an inlet side designed to assist a user to position a pipette tip with respect to the capillary, or designed to position a drop of liquid dispensed from the pipette tip. Transparent or translucent means with respect to the optical wavelength being used for detection. Depending upon the dye, this could use visible, infra red, or ultraviolet light. Other sensing methods could include sensing the position of the liquid using sensors measuring capacitance, impedance, electrochemical properties, surface acoustic wave, surface plasmon resonance, temperature sensor, or other optical means such as detecting changes or value of refractive index, dielectric strength, or conductivity. The measuring liquid could contain a fluorescent dye to facilitate discerning the liquid/air interface. A light in the measuring device or projected through a window or lens, might assist in discerning the liquid/air interface.

The capillary could be coated or surface treated to make the surfaces particularly hydrophobic, hydrophilic, lipophobic, lipophilic, and/or other analogous property. The capillary can be hydrophilic while the well region of the device is hydrophobic, thereby encouraging the dispensed liquid to enter the capillary. Alternatively, the capillary could be lipophilic while the entrance region could be lipophobic and the liquid being dispensed could be oil or lipid based. Alternatively, the well region could be filled with an oil or lipid and the capillary could be lipophobic and hydrophilic, thereby an aqueous liquid would be dispensed by the pipette and not stick to the walls of the well region of the device because they are coated with the lipid or oil. Or vice versa, the capillary could be hydrophobic but lipophilic and the well region could contain an aqueous solution that does not enter the capillary, yet a small volume of lipid or oil dispensed into a funnel shaped region, or other geometrically shaped region to lead the droplet to the entrance of the capillary, would make contact with the capillary. Since the capillary has lipophilic surfaces, surface tension would draw the drop of dispensed liquid into the capillary.

The surfaces of the measurement device may consist of or be coated in hydrophilic or hydrophobic plastic or other material. For instance, the well area of the measurement device could be made substantially hydrophobic by plasma treating of a plastic in order to allow an aqueous measurement fluid to more completely enter the capillary.

The capillary could be coated or surface treated to react to the dispensed liquid. For example, a color change could indicate where the liquid is present. The shape of the capillary, such as (20) shown in FIG. 9, could aid in visually determining the location of the meniscus.

Placing the capillary at a slight angle or with a slight taper in internal diameter would ensure that the liquid plug did not travel up the capillary and distort the determination of the volume of liquid. Alternatively, the capillary could be shaped to encourage the liquid plug to travel to a specific region of the capillary. The capillary could be positioned at an angle different than horizontal in order to encourage better placement of the measurement fluid.

The capillary may be oriented vertically, so that gravity assists the flow of the measurement fluid downward into the capillary. Similarly, centripetal force may also be used to assist the flow of the measurement tube into the capillary. The exhaust end of the capillary may be open to the air or sealed with a hydrophobic surface such as hydrophobic polypropylene weave.

The internal volume or cross-sectional area of each capillary could be measured for more accurate results. Graduations or markings on or near the capillary could be adjusted to account for the internal volume of the specific capillary. The capillary could be tracked, such as by an identification number, and the specific measurements for that capillary could be used for the determination of the volume of the dispensed liquid.

By including graduations on or adjacent to the capillary, and by knowing the internal volume of the capillary from the inlet to each graduation, and by using a liquid such that the meniscus between the liquid and air is discernible, the volume of liquid in the capillary can be determined by someone observing the capillary or by sensors in the measuring device or an attached device. Likewise, sensors in known locations with respect to the capillary can determine the volume without graduations present.

The measuring device could be designed for the user to visually determine if a pipette is within calibration standards. This could be done by having two lines (17 in FIG. 9) or otherwise demarcated region in the capillary. If the meniscus falls in this region, then this measuring device would validate that the pipette is still within calibration standards.

Alternatively, the measuring device could fit onto an instrument that senses the volume of liquid in the device or the location of the meniscus. In one embodiment, the instrument observes the location of the meniscus and the demarcated regions in each capillary using image processing. In another embodiment, the instrument determines the error in the dispense volume and sends the suggested correction to the robotic dispenser or displays or prints the suggested correction to the person calibrating the pipette.

The pipette tip could be positioned so that as liquid is dispensed from the pipette tip, the liquid contacts the surface of the capillary and is then drawn into the capillary by surface tension forces. This could be accomplished using V-grooves, such as two V-grooves, possibly with one inverted or oblique with respect to the other. This could be accomplished with funnels or rings or portions there of or other features to limit the placement of the pipette or pipette tip. Alternatively, custom dispense tips or pipette tips could be used with features to guide, place, or lock the pipette tip in a particular location. For example, the pipette tip could have a collar, whereby the collar provides a mechanical stop against a boss on the measuring device, for placing the tip the correct distance from a wall of the well. As another example, a recess in the pipette tip could mate with a ridge on the measuring device, thereby aiding the user in positioning the pipette tip with respect to the well.

The dispensed liquid could first touch a surface other than the capillary, and still rely upon surface tension to draw in the entire volume of liquid once the drop of liquid spreads out and does contact the capillary.

If a channel is used, the well region could have a catch basin or hopper type geometry to conduct the liquid into the rest of the channel. If an aqueous liquid is used and the channel is hydrophilic, or if an oily liquid is used and the channel is lipophilic, surface tension would draw the liquid from the wider well region to the narrower channel, and the volume of the hopper or catch basin would not come into consideration. Alternatively, the channel could be designed so that the liquid remains and fills the catch basin or hopper region, and the volume of liquid in this region would be known. A combination of the two could also exist, in which the liquid would remain in only a portion of the catch basin or hopper region.

If the measuring device contains a well region that funnels down in size, thereby directing the dispensed liquid toward the inlet of the capillary with the well walls that are hydrophobic or lipophobic, or at least less hydrophilic or lipophilic than the capillary, then once the liquid drop touches the capillary, it would be pulled inside. In this case, the capillary needs to be placed where the liquid drop will touch it. For example, if a drop of liquid would tend to form a 2 mm diameter sphere, then the center of the capillary should be about 1 mm above the floor of the well, and the well should not be much larger than 2 mm in diameter, thus ensuring that the drop touches the capillary.

The advantages of the present invention include, without limitation, the fast and inexpensive verification of the continued accuracy of a calibrated liquid dispensing device. Additionally, repeat tests can be used to determine the repeatability of the dispensing device both at the same volume and at many different volumes. The fluid for measurement can be included with the measurement device.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A device for measuring a volume of liquid, the device comprising:
    a well for receiving the volume of liquid;
    a capillary having an open proximal end facing the well;
    means for selectively causing the volume of liquid to flow from the well into the capillary, wherein the volume of liquid includes a first meniscus within the capillary proximate to the open proximal end and a second meniscus within the capillary; and
    means for measuring the volume of liquid present within the capillary based on locations of the first meniscus and the second meniscus within the capillary.

2. The device of claim 1, wherein the capillary has a diameter capable of drawing liquid from the well using surface tension when the capillary and the well are positioned close to or in contact with each other.

3. The device of claim 1, wherein the means for selectively causing includes means for maintaining the first meniscus at the open proximal end of the capillary.

4. The device of claim 1, wherein the means for selectively causing includes at least one of: a pivot, a four-bar linkage, or a slide, for moving at least one of: the well or the open proximal end of the capillary, such that the well and the open proximal end of the capillary are positioned close to or in contact with each other to cause the capillary to draw the liquid from the well.

5. The device of claim 4, wherein the well and the open proximal end of the capillary are positioned at most 0.5 mm from each other.

6. The device of claim 1, wherein the means for selectively causing includes holding the capillary at an incline.

7. The device of claim 6, wherein the open proximal end is lower than a distal end of the capillary.

8. The device of claim 1, wherein the means for measuring includes a set of markings located on at least one of: the capillary or a housing of the device.

9. The device of claim 8, wherein the set of markings includes a pair of markings defining a region for a location of the second meniscus corresponding to an acceptable volume of liquid.

10. The device of claim 1, wherein the means for measuring includes:
    a set of sensors for determining at least one of: a location of the first meniscus or a location of the second meniscus; and
    an instrument for acquiring data from the set of sensors and producing a digital measurement of the volume of liquid.

11. The device of claim 1, wherein the device includes a plurality of pairs of wells and capillaries.

12. The device of claim 11, wherein the plurality of pairs of wells and capillaries includes at least one of: a plurality of wells of different sizes or a plurality of capillaries of different sizes.

13. The device of claim 1, further comprising a reservoir for storing liquid for dispensing into the well.

14. A device for measuring a volume of liquid, the device comprising:
    a well for receiving the volume of liquid;
    a capillary having an open proximal end facing the well;
    means for pivoting the well into proximity with the open proximal end of the capillary, wherein the volume of liquid flows from the well into the capillary when the well is located in proximity with the open proximal end of the capillary, and wherein the volume of liquid includes a first meniscus within the capillary proximate to the open proximal end and a second meniscus within the capillary; and means for measuring the volume of liquid present within the capillary based on locations of the first meniscus and the second meniscus within the capillary.

15. The device of claim 14 wherein the means for measuring includes a set of markings located on at least one of: the capillary or a housing of the device.

16. The device of claim 15, wherein the set of markings includes a pair of markings defining a region for a location of the second meniscus corresponding to an acceptable volume of liquid.

17. The device of claim 15, wherein the set of markings are located on a top surface of the housing of the device.

18. A device for measuring a volume of liquid, the device comprising:
  a housing;
  a well for receiving the volume of liquid;
  a capillary having an open proximal end facing the well, wherein the capillary has a diameter capable of drawing liquid from the well using surface tension when the capillary and the well are positioned close to or in contact with each other;
  wherein the housing includes means for moving at least one of: the well or the capillary, to position the open proximal end of the capillary close to or in contact with the well to cause the capillary to draw the liquid from the well; and
  a set of markings located on at least one of: the capillary or the housing; wherein the set of markings enable measurement of the volume of liquid based on locations of a first meniscus of the volume of fluid within the capillary proximate to the open proximal end and a second meniscus of the volume of fluid within the capillary.

19. The device of claim 18, wherein the device includes a plurality of pairs of wells and capillaries.

20. The device of claim 18, wherein the means for moving includes means for pivoting the well into proximity with the open proximal end of the capillary.

* * * * *